United States Patent [19]
Kaller

[11] 3,827,700
[45] Aug. 6, 1974

[54] SEALING DEVICE
[76] Inventor: Sigurd Kaller, Vadursgatan 2A, S-58245 Linkoping, Sweden
[22] Filed: Sept. 29, 1972
[21] Appl. No.: 293,718

[30] Foreign Application Priority Data
Oct. 1, 1971 Sweden............................ 12427/71
Aug. 29, 1972 Sweden............................ 11105/72

[52] U.S. Cl................................. 277/59, 277/73
[51] Int. Cl............................................ F16j 15/40
[58] Field of Search............ 277/58, 59, 60, 75, 73

[56] References Cited
UNITED STATES PATENTS
2,286,425   6/1942   La Bour.............................. 277/60

Primary Examiner—Louis R. Prince
Assistant Examiner—Robert I. Smith
Attorney, Agent, or Firm—Sughrue, Rothwell, Mion, Zinn & Macpeak

[57] ABSTRACT

A sealing arrangement for a high pressure gas cylinder closed at one end by a slideable piston. An annular space between the piston and cylinder carries opposing sealing members with facing sealing lips. Oil in the cavity between the sealing members is kept under pressure by the expansive force of the gas in the cylinder. The oil pressure is always maintained higher than the gas pressure by either a spring urging the sealing members together, or a stepped construction whereby the reactive area of the cavity is less than the active area between the piston and cylinder.

4 Claims, 2 Drawing Figures

PATENTED AUG 6 1974

3,827,700

SEALING DEVICE

This invention relates to a sealing device for preventing leakage of high-pressure gas between two relatively movable elements, comprising at least two spaced and facing sealing members defining together with the movable elements a space for a non-gaseous medium.

Sealing devices of this kind present the problem of maintaining the non-gaseous medium at a pressure sufficient to prevent gas leakage. Attempts have been made to solve this problem by connecting a pump to said space to produce therein a pressure providing the desired sealing but such solution increases the cost of the sealing device to such an extent that it cannot be practised.

The object of the invention, therefore, is to provide a sealing device in which a pressure higher than that of the high-pressure gas is maintained irrespective of variations in the pressure of the high-pressure gas.

This object is fully accomplished by the invention, which is characterized in that a first sealing member contiguous to the high-pressure gas is displaceable under the action of the high-pressure gas towards a second sealing member contiguous to the low-pressure side and in that means coacting with the displaceable sealing member are adapted to impart to the medium confined in said space a resulting pressure higher than the pressure of the high-pressure gas.

Figure 1:
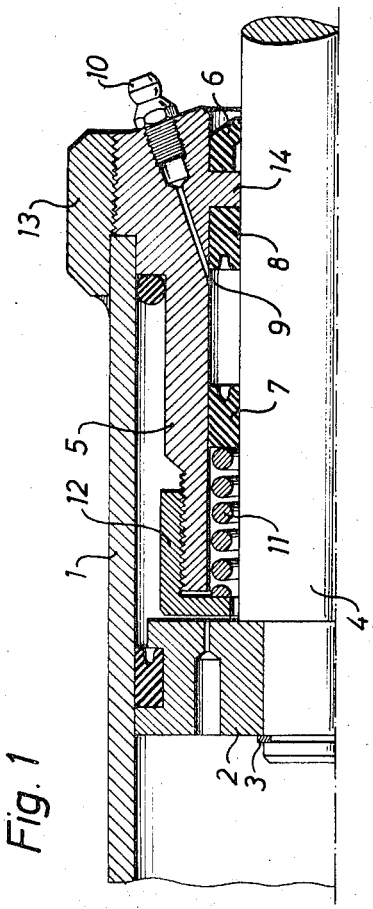
Figure 2:
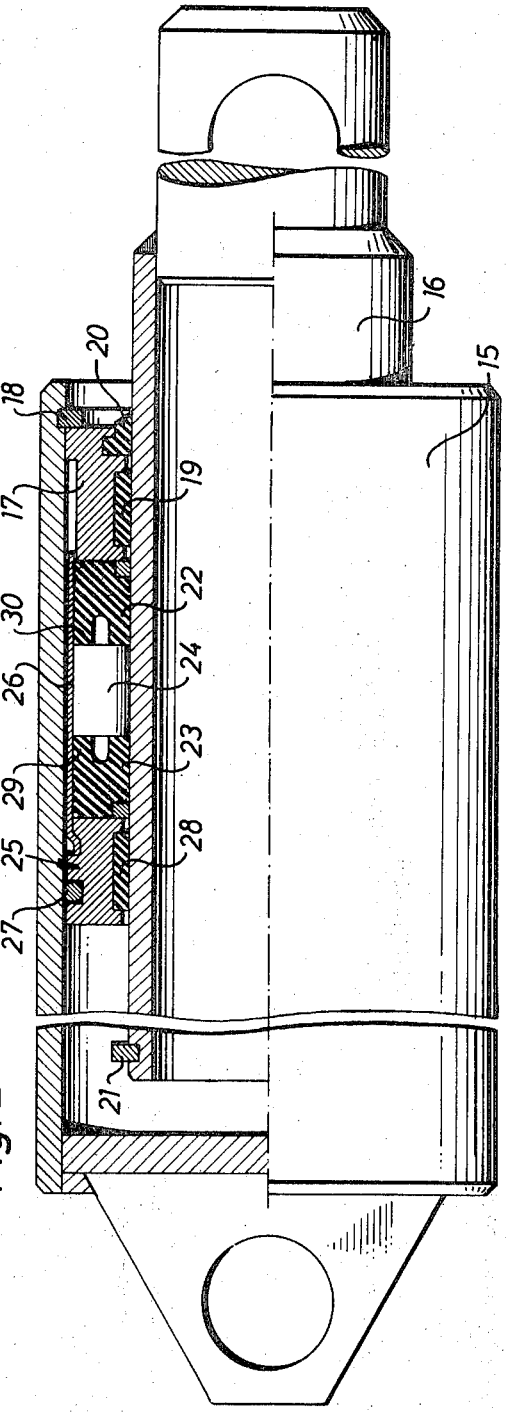

Two embodiments of the invention are described with reference to the drawings, in which FIG. 1 is an axial sectional view of the first embodiment and FIG. 2 is an axial sectional view of the second embodiment.

The pneumatic spring device shown in FIG. 1 includes a cylinder 1 and a piston 2 slidable in the cylinder and releasably connected to a piston rod 4 by means of a retaining ring 3. The cylinder 1, of which only an end portion is illustrated in the drawing, has at the illustrated end a collar 13 welded thereto, which releasably connects an end piece 5 with the cylinder by means of an internal thread. The piston rod 4 passes through a central bore of the end piece 5, which bore has two wider portions and in intermediate reduced portion so that there is provided in the bore an internal radial flange 14, the inner peripheral edge of which is intended to support the piston rod 4.

In the right-hand, as seen in the drawing, wider portion of the bore of the end piece 5 there is provided a dirt-stopping sealing ring 6, which serves to prevent foreign matter from entering into the cylinder 1 with the piston rod 4. In the inner, left-hand wider portion of the bore there are provided two facing sealing rings 7 and 8. The sealing rings 7 and 8 are axially spaced and are initially in sealing engagement with both the piston rod 4 and the end piece 5. The sealing ring 8 also has its rear side abutting the flange 14 and in the immediate vicinity of the front side of this sealing ring there opens a passage 9 bored in the end piece 5 with which passage a nipple 10 having a non-return valve communicates. The sealing ring 7, in its turn, has its rear side abutting one end of a compression spring 11, the other end of which rests against an internal flange of a collar 12 screwed onto the end of the end piece 5 extending into the cylinder 1. Thus, the spring 11 urges the sealing ring 7 towards the sealing ring 8 and during assembly the spacing of the sealing rings 7 and 8 therefore is substantially smaller than shown in the drawing. The introduction of a liquid, preferably a lubricating oil, a grease or some other comparable medium through the nipple 10 and the passage 9 into the space that is defined between the piston rod 4 and the end piece 5 and axially limited by the sealing rings 7 and 8, will cause the sealing ring 7 to be displaced to the left in the figure against the action of the spring 11 as the oil, etc. is fed into the said space. Spring-loading the sealing ring 7, which is adapted to be contiguous to the gas confined in the cylinder 1, in this manner, will cause the oil, etc., confined between the sealing rings 7 and 8 to assume at all times a pressure higher than the gas pressure existing in the cylinder. The facing sealing lips of the sealing rings 7 and 8 therefore will engage the piston rod 4 as well as the end piece 5 under sufficient pressure to prevent gas leakage between the piston rod 4 and the end piece 5.

Using a lubricating oil as the medium will secure, in addition to the sealing, the requisite lubrication of the piston rod. This means that oil will be consumed in the course of time, resulting in a corresponding displacement of the sealing ring 7 towards the sealing ring 8 under the action of the spring 11. Accordingly, lubricating oil must be introduced through the nipple 10 at interval.

FIG. 2 shows a second embodiment comprising a cylinder 15 and a piston 16 displaceable therein. At the right-hand end, as seen in the Figure, of the spring device an end piece 17 is inserted into the cylinder and retained therein by a retaining ring 18. The end piece, which is supported by the cylinder only at its outer end, is provided with a sliding ring 19 for guiding the piston and a sealing ring 20 preventing the piston from carrying dirt with it on its displacement inwardly in the cylinder. Displacement of the piston 16 outwardly from the cylinder 15 is limited by a second retaining ring 21 mounted on the inner end of the piston.

The sealing between the cylinder and the piston is accomplished by means of a sealing device, which is inserted into the cylinder and located by the end piece 17 and which comprises two sealing members 22 and 23. These sealing members are axially spaced so that an annular space 24 is defined about the piston between the two sealing members. This space is adapted to be filled with oil, grease or some other non-gaseous medium. The sealing member 22 disposed nearest to the outer end of the cylinder 1 has its rear side abutting the end piece 17, while the inner sealing member 23 has its rear side abutting a ring 25. This ring, which is displaceable in the cylinder, is rigidly connected to, or integral with, a sleeve 26 that is slidably fitted in the cylinder. The sleeve extends from the ring 25 along and past the two sealing members 22 and 23, which are sealingly engaged by the sleeve. In addition, a sealing ring 27 is disposed in an exterior groove in the ring 25 to provide a seal between the latter and the cylinder. The ring 25 is also provided with an interior sliding ring 28 similar to the sliding ring 19, and like the latter the other sliding ring 28 is adapted to serve as a guide for the piston 16.

In the illustrated exemplary embodiment the piston 16 essentially consists of a tube having its interior in free communication with the interior of the cylinder, which is intended to be filled with gas at high pressure. The pressure of the gas will then act axially on the piston 16 to urge the piston outwardly of the cylinder. Not only the piston is acted on by the gas pressure, however, but the ring 25 and the associated sleeve 26 will also be urged in the same direction as the piston 16. Since the ring 25 abuts the sealing member 23, the latter will be subjected to the gas pressure acting on the ring 25 and transmit this pressure to the hydraulic oil trapped in the space 24. The pressure thus produced in the space 24 will cause the sealing lips 29 and 30 of the sealing members 22 and 23 to be pressed against the piston 16 and the sleeve 26 under a pressure related to the gas pressure. Since the gas is permitted to act on the entire end surface of the ring 25, while the sealing ring 23 acts on the medium trapped in the space 24 over an end surface, which is smaller than said end surface of the ring by an amount corresponding to the cross-sectional area of the sleeve 26, the oil pressure will always be higher than the gas pressure. As will be readily understood, this pressure difference will also be related to the gas pressure so that it is increased with increasing gas pressure.

As the medium in the space 24 thus is always at a higher pressure than the gas, no gas leakage to or past the space 24 is possible, and accordingly the sealing device may be regarded as perfectly gas tight. This gas tightness, owing to the fact that the gas pressure controls the pressure difference, is moreover completely independent of the pressure level existing at any moment and of rapid or slow pressure variations.

Naturally, the invention is not limited to the above described embodiments shown in the drawings, but may be modified in its details within the scope of the inventive concept. Thus, a sealing device according to the invention is also useful as a seal between relatively rotatable elements.

I claim:

1. Sealing device for preventing leakage of high-pressure gas between two relatively movable elements comprising at least two spaced and facing sealing members defining together with the movable elements a space for a non-gaseous medium, characterized in that a first sealing member contiguous to the high-pressure gas is displaceable under the action of the high-pressure gas towards a second sealing member contiguous to the low-pressure side and in that means coacting with the displaceable sealing member are adapted to impart to the medium confined in said space a resulting pressure higher than the pressure of the high-pressure gas.

2. Sealing device according to claim 1, characterized in that the means coacting with the displaceable sealing member are constituted by spring means acting on the side of the sealing member facing away from the space.

3. Sealing device according to claim 1, characterized in that said means coacting with the displaceable sealing member are constituted by a sleeve member surrounding both sealing members and adapted to be moved together with the displaceable sealing member and during the displacement of the latter sealingly slide on the second sealing member and to form an extension of that surface of the displaceable sealing member, which faces the high-pressure gas.

4. Sealing device according to claim 3, characterized in that the sleeve member includes a rear annular guide member.

* * * * *